Jan. 29, 1929.

F. B. McCROSKY 1,700,234

CHECK VALVE

Filed March 21, 1928

INVENTOR

Fred B. McCrosky

Patented Jan. 29, 1929.

1,700,234

UNITED STATES PATENT OFFICE

FRED BARBER McCROSKY, OF LOS ANGELES, CALIFORNIA.

CHECK VALVE.

Application filed March 21, 1928. Serial No. 263,400.

My invention relates to check valves, and an important object thereof, is to provide a check valve for straight way passage of full pipe area wherein the conduit is entirely unobstructed after the valve is raised off its seat.

Another object is to secure adaptability for perfect functioning of the valve either in horizontally or vertically extending conduit. Special features of design make this valve noiseless in operation. It can be examined easily and is built to withstand hard service.

Other objects and advantages may hereinafter appear.

Referring to the accompanying drawing, illustrating embodiments of the invention which are at present deemed preferable:

Figure 1:
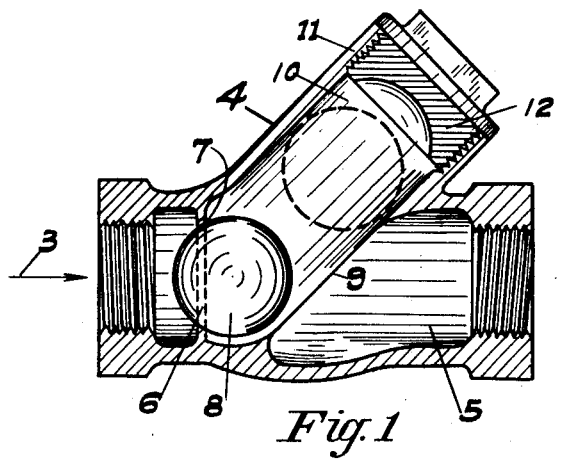
Figure 1 is a vertical mid-section of my newly invented check valve, the valve proper being shown in full lines in its closed position and in dotted lines in its open position.

Referring in detail to the drawing, the check valve construction shown in Figure 1 comprises, a conduit portion 5 having an internally constricted portion illustrated as an annular rib 6, provided with a valve seat 7, but it is to be understood that the invention is not limited to the particular manner in which the conduit is constricted to form this valve seat.

With this seat cooperates a symmetrical valve proper, which, by preference and as shown consists of a spherical body 8 of somewhat greater diameter than that of said valve seat 7, but of less diameter than the opening 9 formed at the intersection of the conduit portion 5 and the cylindrical portion 4 containing recess 10 which it occupies. Movement of valve body 8 in one direction is arrested by aforesaid valve seat 7, its movement in the opposite direction through the main conduit portion 5 of the check valve being prevented by the diminished diameter of the conduit portion 5 intersecting with the cylindrical portion 4 forming the recess 10, the orifice of which is equal to the diameter of the main conduit connecting with the fitting though of less diameter than that of the ball 8. The cylindrical portion 4 provides an internal guiding means or raceway adapted to direct the valve proper into a recess 10 when the current 3 flows through the conduit in a direction to unseat the valve. Said recess 10 is formed within a branch 11 of the fitting, the outer end of this branch being closed by a screw threaded bonnet 12, which is screwed in place after the ball 8 has been inserted.

The valve body 8 will perform its function properly whenever the fitting is maintained in such a position that the inner end of its branch 11 is sufficiently beneath its outer end to permit the ball 8 to gravitate into the main part of the fitting. It is evident that this would still be the case if the main part of the fitting as viewed in Figure 1 were to be turned about in such a manner as to bring its right end uppermost.

Figures 2, 3:
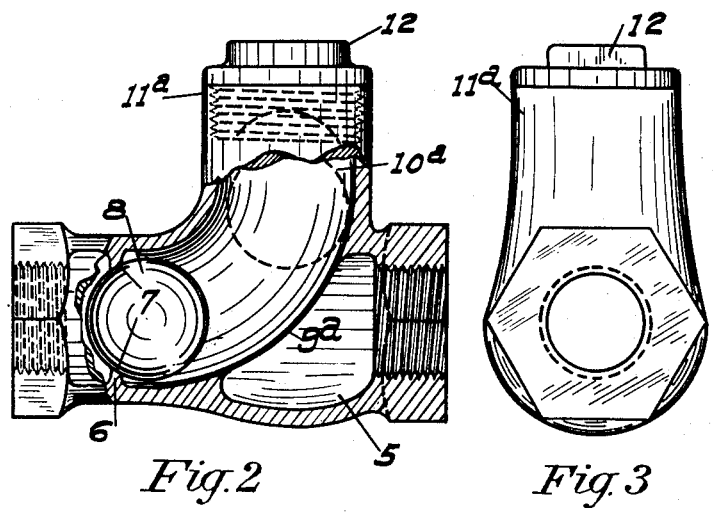
Figure 2 is a similar section of the valve showing a slightly modified construction.
Figure 3, is an end elevation looking at the right end of Figure 2.

It will be seen that when the valve is located in a horizontal conduit, as seen in Figure 2, it will remain completely on its seat only when held thereagainst by fluid pressure; otherwise it will drop slightly into the clearance therebeneath.

Also the raceway for conducting the valve out of the path of liquid flow through the conduit is of an arcuate form and of greater diameter than the valve, the lower end of the arc thereof blending with the internal lumen of the conduit at a point adjacent to the annular valve seat. This construction provides a very easily opened valve.

The conduit portion 5 serves as an alcove adapted to produce a whirl pool effect, and also to collect of the heavier particles of sediment which otherwise might interfere with the proper seating of the valve.

The embodiment of the invention illustrated in Figure 2 differs from that of Figure 1 only in that the branch $11^a$ of the fitting having the recess $10^a$ is curved sufficiently to bring its outer portion at a right angle to the body portion of the fitting, the valve guiding cylindrical portion likewise being curved. The other parts shown in Figures 2 and 3 are substantially the same as in Figure 1 and are therefore designated by the same reference numerals. In both forms the branch 11 and $11^a$ of the fitting has an internal diameter somewhat greater than the diameter of the spherical valve body 8.

In operation, current tending to unseat the valve body will also tend to overcome its gravity and force it up into the recess 10 (or $10^a$) into which it is guided by the cylindrical walls of the branch line containing the recess 9 or ($9^a$). When the current subsides or is reversed, the valve body 8, aided by gravity, will gravitate toward its seat, and any considerable flow of liquid from right to left will quickly bring the valve to its seat. It will be seen that when the valve proper is housed in the recess 10 or (10ª) it will be out of the course of the liquid stream 3 when the latter flows from left to right, and therefore will not impede the intake of a pump or other device which may be connected to the fitting.

It will therefore be seen that this check valve may properly be termed a "straight line" check valve as it is particularly adapted for insertion in a straight line of pipe, a section of which is formed by the valve-containing fitting which I have shown and described.

I claim:

1. A check valve construction comprising a conduit having an internal annular shoulder therein adapted to form a valve seat and lying in a plane perpendicular to the axis of the conduit, a valve proper consisting of a spherical body adapted to fit upon said seat and to be held thereto in spaced relation to the internal wall of the conduit by fluid pressure in one direction, said conduit being provided with a lateral recess adapted to house said valve proper when the latter is in operative position, guiding means for said valve, properly adapted to conduct it into said recess when it is forced away from its seat by the fluid pressure which passes through said conduit, said spherical body gravitating to a partially open position as soon as the last recited pressure is released.

2. A check valve construction comprising a conduit having an internal annular shoulder therein adapted to form a valve seat and lying in a plane perpendicular to the axis of the conduit, a valve proper consisting of a spherical body adapted to fit upon said seat and to be held thereto in spaced relation to the internal wall of the conduit by fluid pressure in one direction, said conduit being provided with a lateral recess adapted to house said valve proper when the latter is in operative position, guiding means for said valve proper adapted to conduct it into said recess when it is forced away from its seat by the fluid pressure which passes through said conduit, said spherical body dropping to a partially open position as soon as either the fluid pressure tending to hold it to its seat or in suspended position in said lateral recess is released.

3. A check valve construction comprising a conduit having an annular shoulder therein adapted to form a valve seat and lying in a plane perpendicular to the axis of the conduit, a valve proper consisting of a spherical body adapted to fit upon said seat in operative position and to be held thereto in unstable equilibrium by fluid pressure in one direction, said conduit being provided with an integral lateral recess adapted to house said valve proper when the latter is in the inoperative position, whereby the full cross sectional area of the straightway passage of the conduit remains unrestricted, guiding means for said valve proper adapted to conduct it into said recess when it is forced away from its seat by fluid pressure within said conduit, said valve proper gravitating towards its seat and remaining in partially open position when said fluid pressure tending to unseat said valve subsides and to be retained in said partially open position until either reseated by fluid pressure in one direction or forced into said recess by the reverse pressure of said fluid.

4. A check valve construction comprising a horizontal conduit having a circumferential internal annular shoulder therein, a spherical valve of greater diameter than the internal diameter of said shoulder, said spherical valve being arranged to seat upon one side of said shoulder, said valve being of less diameter than the internal diameter of the conduit, at that side of said annular shoulder whereby said valve is caused to fall slightly and to assume a partially open position except when held to its seat by fluid pressure.

FRED BARBER McCROSKY.